G. F. LONG.
BUMPER FOR AUTOMOBILES.
APPLICATION FILED SEPT. 5, 1916.
1,305,292.
Patented June 3, 1919.
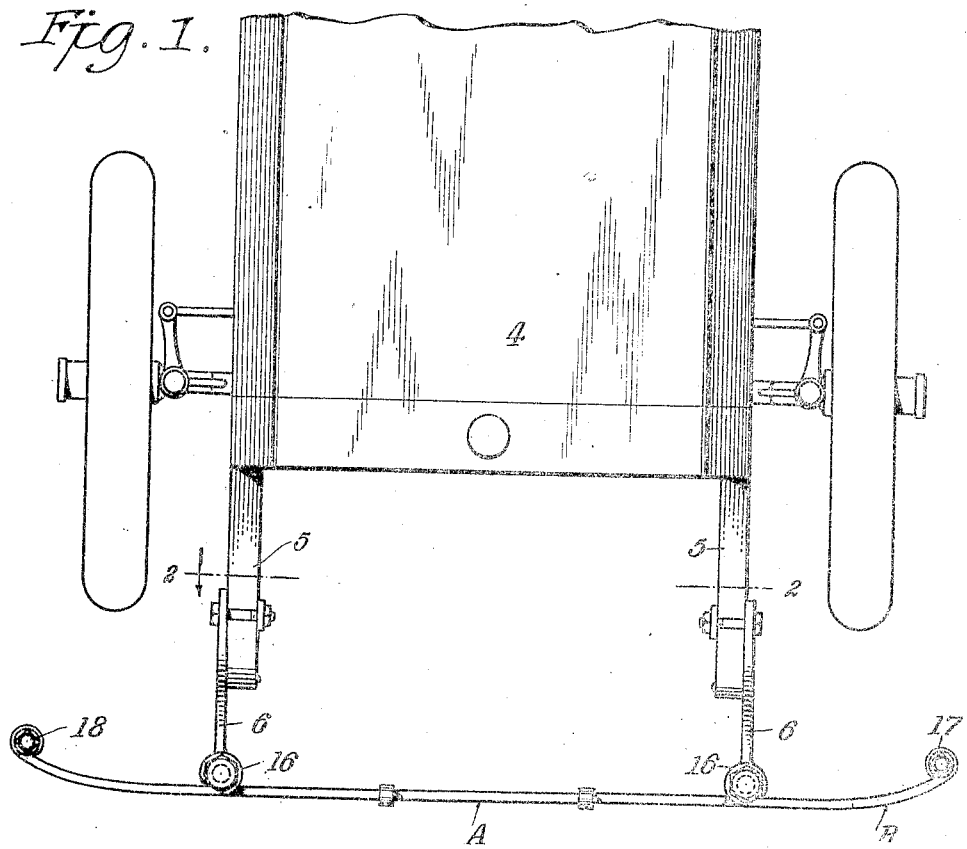
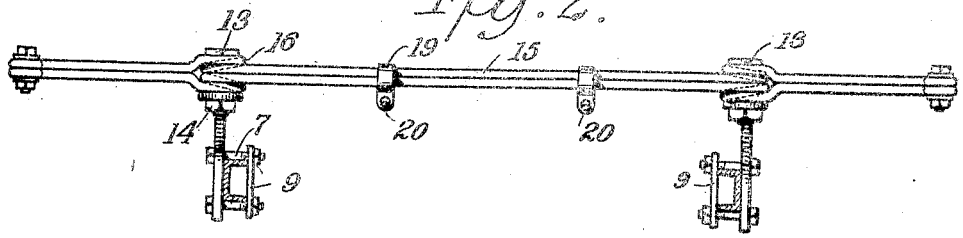
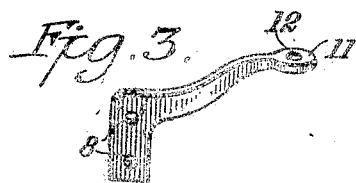
Inventor
George F. Long
By his Attorney
Messimer & Austin

UNITED STATES PATENT OFFICE.

GEORGE F. LONG, OF NEW YORK, N. Y.

BUMPER FOR AUTOMOBILES.

1,305,292.  Specification of Letters Patent.  Patented June 3, 1919.

Application filed September 5, 1916. Serial No. 118,466.

*To all whom it may concern:*

Be it known that I, GEORGE F. LONG, a citizen of the United States, and resident of New York city, in the county of Queens and State of New York, have invented certain new and useful Improvements in Bumpers for Automobiles, of which the following is a specification.

My invention relates in general to a bumper or fender of general application for use wherever such devices may be employed and particularly designed for use in connection with the metal chassis of motor driven vehicles.

One of the objects of the invention is to provide a simplified type of bumper which can be constructed cheaply so as to be marketed at a relatively low cost.

Incidental to this general object it is among further desiderata to provide a device of the class described which can be readily constructed from standard stock material; which may be formed of relatively few parts and which parts can be formed and assembled in position with the minimum amount of machining or other expensive mechanical operation.

A further object of the invention is to provide a type of bumper with high resiliency sensitive to any pressure exerted thereon but which will be sufficiently rugged to resist abnormally heavy shocks within the capacity of the device.

Another object of the invention is to provide a device of the class described, which will transmit and diffuse over the entire device, any localized shock imposed thereon at any point along its length.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is a fragmentary view in plan of the forward portion of an automobile showing a preferred embodiment of my invention attached thereto;

Fig. 2 is a transverse sectional view taken on the line 2—2 and showing the bumper in elevation; and Fig. 3 is an enlarged detailed view of one of the holding brackets.

In the following description and in the claims, parts will be identified by specific names for convenience of expression but they are intended to be as generic in their application to similar parts as the art will permit.

In the drawings there is shown a conventional form of motor vehicle 4, including a chassis having forwardly extending side sills 5, designed to constitute a support and under some conditions to coact with part of the bumper particularly forming the subject matter of this invention to give the same additional resiliency. A pair of brackets 6, particularly shown in Fig. 3, are demountably fixed to the outside of the sills so as to form a large bearing surface between the bracket and its adjacent sill when the brackets tend to approach each other. The brackets are held in position by means of bolts 7 passed through bolt holes 8 and are positioned above and below the side sills and connected on the opposite side by means of a tie plate 9 so as to form a boxing about the sills. This arrangement permits a ready adjustment of the brackets longitudinally of the side sills, so as to provide any desired transverse angularity to the bumper mechanism and provides a slight degree of flexibility to the brackets in a horizontal plane transversely of the vehicle. The forward end of each of the brackets is formed into a flat horizontal bearing plate 11 and is provided centrally thereof with a pivoting hole 12. A vertically disposed pivoting pin 13, preferably in the form of a headed bolt, is positioned in the hole 12 and is held in place by the lock nuts 14. The primary shock absorbing element of the bumper is in the form of a rod 15 possessing any desired resiliency best suited for the character of machine to which it is to be attached. The rod illustrated is circular in cross section and extends transversely across the front of the vehicle between and beyond the pivot pins 13. The portions of the rod at each of the pins are wrapped one in a clock-wise and the other in an anti clockwise direction about the pins so as to form pivoting loops 16 about each pin. The free ends of the rod are bent into closed eyes 17 encircling end pivot pins or small bolts 18.

While the device is operative with but one rod, a structure may be formed of any number of these rods built up vertically, and in the drawings, two such rods are illustrated. In this arrangement the loop portions of the rods at each pin are offset vertically in opposite directions and looped about the pins as shown more particularly in Fig. 2.

While it is not an essential feature of invention, it may be desirable, under some circumstances, to fasten the rods together and for this purpose straps 19 are shown looped about the rods, which straps are demountably held in place by screws 20.

In operation and assuming that the rod comes in contact with an object at the point indicated at A in Fig. 1, it will be understood that the tendency of the rod will be to bend inward in a curve depending upon the direction, place of application and intensity of the shock. This will cause a swinging of opposite sides of the bar about the pivot pins with a tendency of the pins to move toward each other. The shock at any place along the length of the rod will be transmitted initially across the entire length of the rod. Should there be a greater shock at the point A than previously suggested, then there will be a tendency for the outer ends of the brackets themselves to bend inwardly toward each other, and should the shock be of even greater magnitude the tendency of the heavy side sills will be to bend slightly toward each other. In this way there is provided a type of bumper particularly sensitive to light thrusts but capable of progressively absorbing shocks of greater and greater intensity and any shock will be absorbed so long as the chassis itself will sustain such distorting shocks.

Should the rod come in contact with its obstacle at the point B to the outside of the pivots, the tendency of the free end of the rod receiving the shock will be to swing inward toward the vehicle and about the adjacent pivot. In this case the shock will be transmitted more particularly through the adjacent bracket and back to the chassis of the vehicle.

By adjusting the position of the brackets on the side sills any desired angular adjustment of the rod relative to the vehicle may be provided and by varying the lengths of the projecting portions of the brackets on the side sills the resiliency of the buffer may be varied somewhat.

It is obvious that by means of a device of this character all of the parts may be readily formed, without any expensive or refined machining; the brackets may be readily stamped or cast and it is a simple operation to bend the rods into their pivoting loops. Any desired resiliency may be provided by varying the character of stock in the rod and any desired strength of structure may be attained simply by multiplying the number of rods used. Even if the rod should be set or bent out of shape, a new rod may be quickly formed with pivoting loops and readily substituted for the old rod.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. The combination with a vehicle having two horizontally spaced apart supports extending forwardly therefrom, and a pair of vertically disposed pivot pins carried by said supports, of a bumper extending transversely of the vehicle and including a resilient rod having portions adjacent opposite ends formed into loops encircling said pivot pins, whereby portions of the rods on opposite sides of each pin are permitted a slight swinging action about the adjacent pivot pin.

2. The combination with a vehicle having two horizontally spaced apart supports extending forwardly therefrom, and a pair of vertically disposed pivot pins carried by said supports, of a bumper extending transversely of the vehicle and including a resilient rod having portions adjacent opposite ends formed into loops encircling said pivot pins, whereby portions of the rods on opposite sides of each pin are permitted a slight swinging action about the adjacent pivot pin and means encircled by one of the free ends of said rod.

3. The combination with a vehicle, two spaced apart pivot pins, of a bumper engaging said pins and comprising two rods disposed parallel to each other and positioned close together with the rods looped about each pivot pin and extending in opposite directions therebeyond.

4. The combination with a vehicle, two spaced apart pivot pins, of a bumper engaging said pins and comprising two rods disposed parallel to each other and positioned one above the other, close together with the rods looped about each pivot pin and means for fastening the rods together to form a unitary structure.

5. In a device of the class described, the combination with a vehicle including two slightly resilient supports, of a shock absorbing bumper formed of a plurality of rods each pivoted intermediate its ends to said supports and extending transversely thereof and the ends thereof being free.

6. In a device of the class described, a bumper including a plurality of rods disposed substantially in parallelism and capable of slight relative movement at certain places along their lengths, means for pivotally supporting the rods intermediate their ends and means for alining and fastening together the free ends of said rods.

7. In a device of the class described, the combination with a vehicle including two spaced apart side sills extending forwardly therefrom, brackets carried by the outer side of said sills adjacent their forward ends, means for adjustably fastening said brackets to said sills longitudinally thereof and a shock absorbing member pivoted to said brackets and having free ends extending beyond their pivotal connections with the brackets.

8. In a device of the class described, a shock absorbing member including a resilient rod bent intermediate its end to form two spaced apart pivoting loops and means for engaging the loops to support the same.

Signed at New York city, in the county of New York, and State of New York, this 29 day of August, A. D. 1916.

GEORGE F. LONG.

Witness:
H. F. WHITE.